(12) United States Patent
Li

(10) Patent No.: US 11,840,357 B2
(45) Date of Patent: Dec. 12, 2023

(54) METHOD AND DEVICE FOR DUAL-LIGHT IMAGE INTEGRATION, AND UNMANNED AERIAL VEHICLE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 294 days.

(21) Appl. No.: 17/313,365

(22) Filed: May 6, 2021

(65) Prior Publication Data
US 2021/0278836 A1    Sep. 9, 2021

Related U.S. Application Data

(63) Continuation of application No. PCT/CN2019/111708, filed on Oct. 17, 2019.

(30) Foreign Application Priority Data

Nov. 7, 2018    (CN) .......................... 201811318227.5

(51) Int. Cl.
*B64D 47/08*    (2006.01)
*B64C 39/02*    (2023.01)
(Continued)

(52) U.S. Cl.
CPC ............ *B64D 47/08* (2013.01); *B64C 39/024* (2013.01); *G05D 1/0038* (2013.01); *G06V 20/13* (2022.01); *B64U 2101/30* (2023.01)

(58) Field of Classification Search
CPC .... B64D 47/08; B64C 39/024; G05D 1/0038; G06V 20/13; B64U 2101/30; G06T 5/002;
(Continued)

(56) References Cited

U.S. PATENT DOCUMENTS

2009/0256858 A1    10/2009 Ogikubo et al.
2017/0177938 A1*    6/2017 Papanikolopoulos ......................
G06V 20/17

FOREIGN PATENT DOCUMENTS

CA    2773303    *  3/2011    ............ G01C 11/02
CA    3023910    *  9/2012    ............ G01C 11/02
(Continued)

OTHER PUBLICATIONS

PCT International Search Report, PCT/CN2019/111708, dated Jan. 6, 2020.

*Primary Examiner* — Jerome Grant, II

(57) ABSTRACT

Embodiments of the present invention relate to a dual-light image integration method, a dual-light image integration device and an unmanned aerial vehicle (UAV). The method includes: receiving first image data from a first image device and second image data from a second image device; separately storing the first image data and the second image data; combining the first image data and the second image data to composite third image data; and transmitting the third image data. According to the present invention, dual-light images are processed by using different data processing methods depending on subsequent operations, which can maintain synchronization of the dual-light images during image transmission while avoiding information loss during image storage, thereby well satisfying user needs.

16 Claims, 6 Drawing Sheets

```
┌─────────────────────────────────────────────┐      801
│ Determine a first image property of the      │ ╱
│ first image data at a k^th pixel position    │
│ and a second image property of the second    │
│ image data at the k^th pixel position        │
└─────────────────────────────────────────────┘
                      │
                      ▼
┌─────────────────────────────────────────────┐      802
│ Compare the first image property with the    │ ╱
│ second image property to determine a gray    │
│ value at the k^th pixel position             │
└─────────────────────────────────────────────┘
                      │
                      ▼
┌─────────────────────────────────────────────┐      803
│ Obtain a fused image according to gray       │ ╱
│ values at all pixel positions                │
└─────────────────────────────────────────────┘
```

(51) Int. Cl.
  *G05D 1/00* (2006.01)
  *G06V 20/13* (2022.01)
  *B64U 101/30* (2023.01)

(58) Field of Classification Search
  CPC ............ G06T 5/50; G06T 2207/10016; G06T 2207/20221; H04N 5/2628; H04N 5/45
  USPC ........................................................ 382/162
  See application file for complete search history.

(56) References Cited

FOREIGN PATENT DOCUMENTS

| | | | | |
|---|---|---|---|---|
| CN | 101552874 A | | 10/2009 | |
| CN | 104504670 A | | 4/2015 | |
| CN | 107481465 A | | 12/2017 | |
| CN | 109120869 A | | 1/2019 | |
| JP | 3720268 | * | 11/2005 | ........... G06T 1/0007 |
| KR | 10-2270029 | * | 8/2019 | ........... H04N 21/431 |
| TW | 201528208 | * | 7/2015 | ............... H04N 5/76 |
| WO | WO2011126511 A1 | | 10/2011 | |

\* cited by examiner

METHOD AND DEVICE FOR DUAL-LIGHT IMAGE INTEGRATION, AND UNMANNED AERIAL VEHICLE

CROSS-REFERENCE

This application is a continuation application of International Application No. PCT/CN2019/111708, filed on Oct. 17, 2019, which claims priority to Chinese Patent Application No. 201811318227.5, filed on Nov. 7, 2018, which are incorporated herein by reference in its entirety.

BACKGROUND

Technical Field

The present invention relates to the technical field of unmanned aerial vehicles (UAV), and in particular, to a dual-light image integration method, a dual-light image integration device and a UAV.

Related Art

Dual-light images refer to multi-channel images obtained through integration of photographing or recording a video of the same picture by two or more types of image collection devices, for example, a dual-light photographing system composed of both a visible light imaging device such as a visible light lens and an infrared thermal imaging device.

The dual-light photographing system can simultaneously obtain an infrared imaging image and a visible light image. The two images have respective characteristics that can complement and cooperate with each other to provide more functional options for subsequent processing.

However, different types of image data captured by the existing dual-light photographing system still have some shortcomings in the storage, transmission and compositing process, which restricts the performance of subsequent image transmission and image storage. How to improve a data processing strategy of the dual-light photographing system capturing the dual-light image to avoid the defects of image information loss and poor synchronization of image transmission is a problem that needs to be solved urgently.

SUMMARY

In order to solve the above technical problem, embodiments of the present invention provide a dual-light image integration method, a dual-light image integration device and a UAV that can avoid information loss while ensuring synchronization performance of image transmission.

In order to resolve the above technical problem, the embodiments of the present invention provide the following technical solutions. A dual-light image integration method is provided, including:

receiving first image data from a first image device and second image data from a second image device;

separately storing the first image data and the second image data;

combining the first image data and the second image data to composite third image data; and transmitting the third image data.

Optionally, the third image data is a picture-in-picture image including a primary display picture and a secondary display picture superimposed on the primary display picture.

Optionally, the step of combining the first image data and the second image data to composite the third image data includes:

scaling the first image data to a size corresponding to a first video picture and scaling the second image data to a size corresponding to a second video picture;

with the first video picture as the primary display picture, superimposing the second video picture as the secondary display picture on the primary display picture; or with the second video picture as the primary display picture, superimposing the first video picture as the secondary display picture on the primary display picture; and generating the picture-in-picture image including the primary display picture and the secondary display picture.

Optionally, the third image data is a fused image obtained by fusing, pixel by pixel, the first image data and the second image data.

Optionally, the step of combining the first image data and the second image data to composite the third image data includes:

determining a first image property of the first image data at a $k^{th}$ pixel position and a second image property of the second image data at the $k^{th}$ pixel position according to gray values of the first image data and the second image data at each pixel position;

comparing the first image property with the second image property to determine the gray value at the $k^{th}$ pixel position, where k is an integer from 1 to K, where K is a number of pixels of the first image data and the second image data; and obtaining the fused image according to the gray values at all pixel positions.

Optionally, the step of determining the first image property of the first image data at the $k^{th}$ pixel position and the second image property of the second image data at the $k^{th}$ pixel position according to the gray values of the first image data and the second image data at each pixel position includes:

determining, through a preset detection window, whether smoothness at the $k^{th}$ pixel position exceeds a preset smoothness threshold, where if so, the image properties at the $k^{th}$ pixel position are determined to be smooth, and if not, the image properties at the $k^{th}$ pixel position are determined to be non-smooth.

Optionally, the step of comparing the first image property with the second image property to determine the gray value at the $k^{th}$ pixel position includes:

when the first image property and the second image property are both smooth, determining that the gray value at the $k^{th}$ pixel position is a mean value of the gray values of the first image data and the second image data at the $k^{th}$ pixel position;

when the first image property is smooth and the second image property is non-smooth, determining that the gray value at the $k^{th}$ pixel position is the gray value of the second image data at the $k^{th}$ pixel position; and when the first image property is non-smooth and the second image property is smooth, determining that the gray value at the $k^{th}$ pixel position is the gray value of the first image data at the $k^{th}$ pixel position.

Optionally, the comparing the first image property with the second image property to determine the gray value at the $k^{th}$ pixel position includes:

when the first image property and the second image property are both non-smooth, comparing the gray values of the first image data and the second image data at the $k^{th}$ pixel position; and selecting a larger one of the gray values as the gray value at the $k^{th}$ pixel position.

Optionally, the step of determining, through the preset detection window, whether the smoothness at the $k^{th}$ pixel position exceeds the preset smoothness threshold includes:

calculating differences between the gray value of the first image data at the $k^{th}$ pixel position and gray values at a plurality of adjacent pixel positions, where the adjacent pixel positions are selected by using the detection window; and determining whether the differences from the gray values at the plurality of adjacent pixel positions are all less than a first preset smoothness threshold, where if so, the first image property at the $k^{th}$ pixel position is determined to be smooth, and if not, the first image property at the $k^{th}$ pixel position is determined to be non-smooth.

Optionally, the step of determining, through the preset detection window, whether the smoothness at the $k^{th}$ pixel position exceeds the preset smoothness threshold includes:

calculating differences between the gray value of the second image data at the $k^{th}$ pixel position and gray values at a plurality of adjacent pixel positions, where the adjacent pixel positions are selected by using the detection window; and determining whether the differences from the gray values at the plurality of adjacent pixel positions are all less than a second preset smoothness threshold, where if so, the second image property at the $k^{th}$ pixel position is determined to be smooth, and if not, the second image property at the $k^{th}$ pixel position is determined to be non-smooth.

Optionally, the method further includes: performing one or more visual processing operations on the fused image.

Optionally, the first image data is infrared thermal imaging image data, and the second image data is visible light image data.

Optionally, the method further includes: encoding the first image data, the second image data and the third image data by using a preset encoding algorithm.

In order to resolve the above technical problem, the embodiments of the present invention further provide the following technical solution. A dual-light image integration device is provided, including: a receiving port, a compositing module, an output port and a mass memory, where the receiving port is configured to receive first image data from a first image device and second image data from a second image device;

the compositing module is configured to perform the step of combining the first image data and the second image data to composite the third image data in the dual-light image integration method;

the receiving port is configured to output the third image data; and the mass memory is configured to separately store the first image data and the second image data.

Optionally, the device further includes an encoding module configured to encode the first image data, the second image data and the third image data by using a preset encoding algorithm, where the mass memory is further configured to separately store the encoded first image data and the encoded second image data.

Optionally, the encoding module is specifically configured to: when the first image data and the second image data are pictures, encode the first image data, the second image data and the third image data through JPEG encoding, DNG encoding or TIFF encoding; and when the first image data and the second image data are videos, encode the first image data, the second image data and the third image data through H265 encoding or H264 encoding. The mass memory is an SD card.

To resolve the foregoing technical problem, an embodiment of the present invention further provides the following technical solution: a UAV. The UAV includes:

a UAV body carrying a first image device and a second image device arranged side by side;

the dual-light image integration device, where the dual-light image integration device is connected to the first image device and the second image device and is configured to receive the first image data and the second image data; and an image transmission apparatus connected to the dual-light image integration device and configured to transmit the third image data composited by the dual-light image integration device to a ground terminal.

Optionally, the first image device is an infrared camera, and the second image device is a high-definition camera.

Compared with the prior art, according to the dual-light image integration method provided in the embodiments of the present invention, dual-light images (that is, the first image data and the second image data) are processed by using different data processing methods depending on subsequent applications, which can maintain synchronization of the dual-light images during image transmission while avoiding information loss during image storage, thereby well satisfying user needs.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

Dual-light images generally refer to images obtained through collection by a dual-light image collection device such as a dual-light camera that includes two or more types of lenses. For ease of description, the dual-light camera in the embodiment of the present invention is an image collection device including an infrared camera and a visible light camera, which obtains an infrared thermal imaging image and a visible light high-definition image for the same captured picture through collection.

Figure 1:
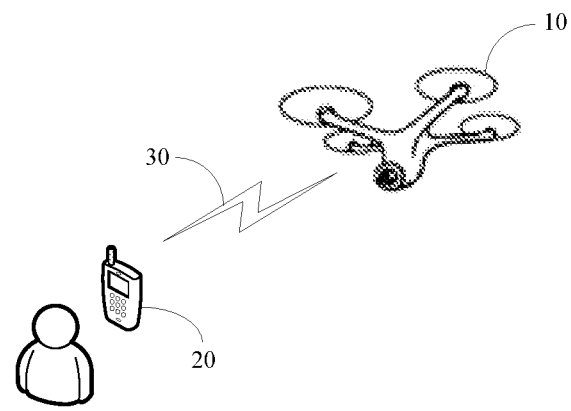
FIG. 1 is a schematic diagram of an application environment according to an embodiment of the present invention.

FIG. 1 shows an application environment according to an embodiment of the present invention. As shown in FIG. 1, the application environment includes a UAV 10, a smart terminal 20 and a wireless network 30.

The UAV 10 may be any type of power-driven UAV, including, but not limited to, a quadrotor UAV, a fixed-wing aircraft and a helicopter model. In this embodiment, the quadrotor UAV is used as an example for description.

The UAV 10 may have a corresponding volume or power according to an actual requirement, to provide a load capacity, a flight speed and a flight mileage that can meet a use requirement. One or more functional modules may further be added to the UAV to enable the UAV to implement corresponding functions.

For example, in this embodiment, the UAV 10 may be equipped with a fixed bracket via a gimbal or the like, and carries a dual-light camera for collecting dual-light images. Correspondingly, the UAV 10 may also be equipped with an image transmission apparatus to upload the dual-light image collected by the dual-light camera to a device connected to the UAV 10.

The UAV 10 includes at least one main control chip, which serves as a control unit of the UAV 10 for flight and data transmission and integrates one or more modules to execute corresponding logic control programs.

For example, in some embodiments, the main control chip may include the dual-light image integration device for performing data processing on the dual-light image and subsequent application, so as to implement the processing, transmission or storage of the dual-light image.

Figure 2:
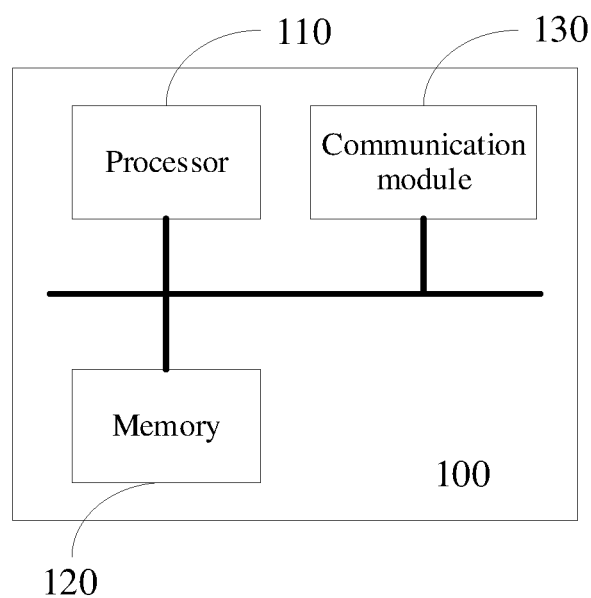
FIG. 2 is a structural block diagram of an electronic computing platform according to an embodiment of the present invention.

FIG. 2 is a structural block diagram of an electronic computing platform according to an embodiment of the present invention. The electronic computing platform may be configured to implement functions of all or part of functional modules in the main control chip. As shown in FIG. 2, the electronic computing platform 100 may include: a processor 110, a memory 120 and a communication module 130.

Any two of the processor 110, the memory 120 and the communication module 130 are communicatively connected by a bus.

The processor 110 may be any type of processor that has one or more processing cores, which can perform single-threaded or multi-threaded operations and is configured to analyze instructions to perform operations such as obtaining data, performing logical operation functions, and delivering operation processing results.

The memory 120 is used as a non-volatile computer-readable storage medium, for example, at least one magnetic disk storage device, a flash memory, a distributed storage device remotely disposed relative to the processor 110 or another non-volatile solid-state storage device.

The memory 120 may have a program storage region used to store a non-volatile software program, a non-volatile computer-executable program and a module to be invoked by the processor 110 to enable the processor 110 to perform one or more method steps. The memory 120 may further have a data storage region used to store the operation processing result delivered and outputted by the processor 110.

The communication module 130 is a functional module configured to establish a communication connection and provide a physical channel. The communication module 130 may be any type of wireless or wired communication module, including but not limited to a Wi-Fi module or a Bluetooth module.

The smart terminal 20 may be any type of smart device configured to establish a communication connection to the UAV, for example, a mobile phone, a tablet computer, a smart remote control or the like. The smart terminal 20 may be equipped with one or more types of different user interaction apparatuses configured to acquire a user instruction or present and feed back information to the users.

The interaction apparatuses include, but not limited to, a button, a display screen, a touchscreen, a speaker and a remote control joystick. For example, the smart terminal 20 may be equipped with a touch display screen. Through the touch display screen, a remote control instruction for the UAV is received from a user, and image information obtained through aerial photography by the dual-light camera is presented to the user. The user may further switch the image information currently displayed on the display screen through a remote touch screen.

In some embodiments, the existing image visual processing technology may further be fused between the UAV 10 and the smart terminal 20 to further provide more intelligent services. For example, the UAV 10 may collect images through a dual-light camera, and the smart terminal 20 analyzes the images, so as to implement gesture control for the UAV 10 by the user.

The wireless network 30 may be a wireless communication network configured to establish a data transmission channel between two nodes based on any type of data transmission principle, for example, a Bluetooth network, a Wi-Fi network, a wireless cellular network, or a combination thereof located in different signal frequency bands.

The application environment shown in FIG. 1 only shows the application of the dual-light cameras on the UAV. Those skilled in the art can understand that the dual-light camera may further be carried on other types of mobile vehicles (such as a remote control car) to perform the same functions. The inventive idea about the dual-light camera and the dual-light image disclosed in the embodiments of the present invention is not limited to the application on the UAV shown in FIG. 1.

Figure 3:
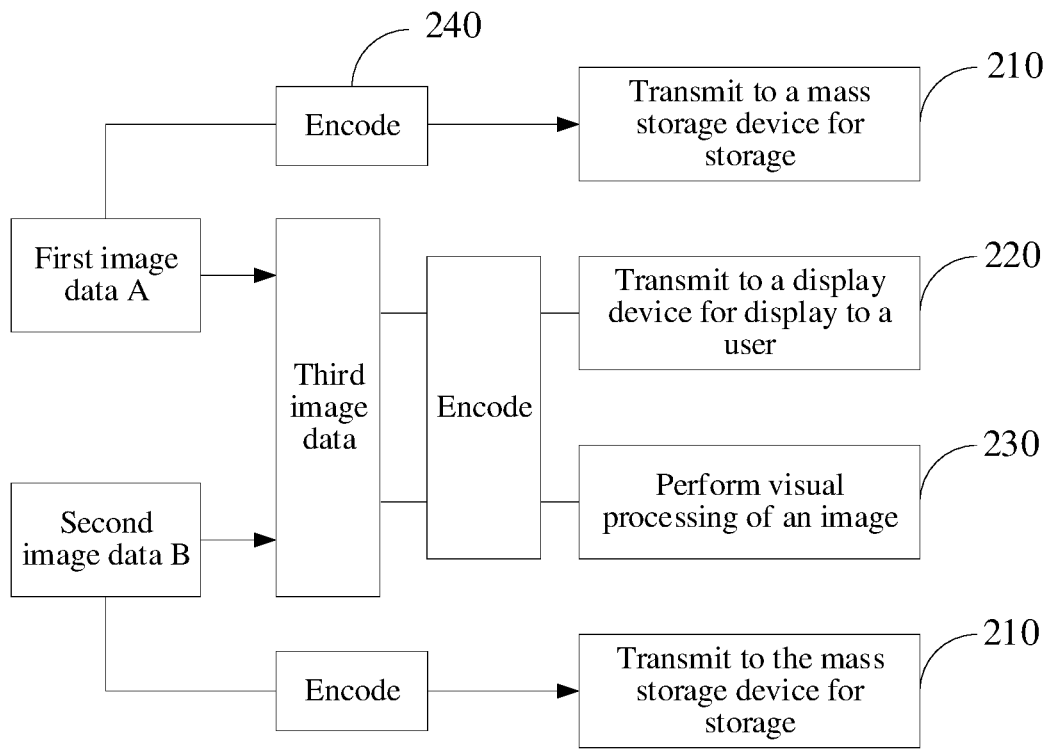
FIG. 3 is a schematic diagram of application of a dual-light image according to an embodiment of the present invention.

FIG. 3 shows an application process of a dual-light image according to an embodiment of the present invention. In the embodiment shown in FIG. 3, the dual-light image includes first image data A and second image data B. The first image data A and the second image data B may be combined and outputted as single-channel third image data.

As shown in FIG. 3, the first image data A and the second image data B are usually collected by the dual-light camera by using the following flow directions: transmitting the first image data and the second image data to a mass storage for storage (210), transmitting the first image data and the second image data to a display device for display to the user (220) or performing image visual processing (230).

Figure 4:
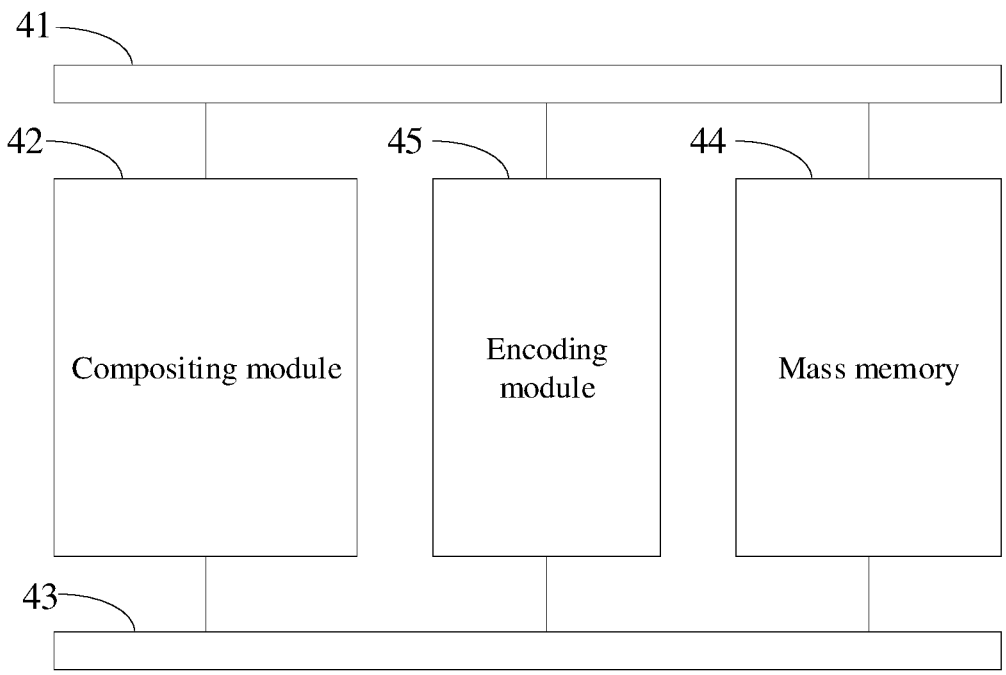
FIG. 4 is a schematic diagram of a dual-light image integration device according to an embodiment of the present invention.

FIG. 4 is an integration device for performing the dual-light image application process shown in FIG. 3 according to an embodiment of the present invention, and may be equipped with corresponding hardware and software units to implement the data processing process shown in FIG. 2. The integration device may specifically be implemented by any existing type of processor chip, which may serve as a separate chip or one of the functional modules to be integrated into a flight control chip of the UAV.

As shown in FIG. 4, the integration device may include: a receiving port 41, a compositing module 42, an output port 43 and a mass memory 44.

The receiving port 41 is an input port connected to a dual-light camera or a data source, which is configured to receive first image data from a first image device and second image data from a second image device.

The compositing module 42 is a functional module for performing image data composition, which may be implemented by software, hardware, or a combination of software and hardware, and is configured to combine the first image data and the second image data to obtain single-channel image data for output.

In some embodiments, the third image data may be a picture-in-picture image including a primary display picture and a secondary display picture superimposed on the primary display picture.

Correspondingly, the compositing module 42 may be specifically configured to: first scale the first image data to a size corresponding to a first video picture and scale the second image data to a size corresponding to a second video picture; with the first video picture as the primary display picture, superimpose the second video picture as the secondary display picture on the primary display picture; or with the second video picture as the primary display picture, superimpose the first video picture as the secondary display picture on the primary display picture; and finally generate the picture-in-picture image including the primary display picture and the secondary display picture.

In some other embodiments, the third image data is a fused image obtained by fusing, pixel by pixel, the first image data and the second image data.

Correspondingly, the compositing module 42 may be specifically configured to: first determine a first image property of the first image data at a $k^{th}$ pixel position and a second image property of the second image data at the $k^{th}$ pixel position according to gray values of the first image data and the second image data at each pixel position; then compare the first image property with the second image property to determine the gray value at the $k^{th}$ pixel position, where k is an integer from 1 to K, where K is a number of pixels of the first image data and the second image data; and finally obtain the fused image according to the gray values at all pixel positions.

Those skilled in the art may choose to use corresponding software, hardware, or a combination of software and hardware to implement the functions (for example, one or more comparison circuits, an image window processing circuit or the like) according to the functional steps to be performed by the compositing module 42 disclosed in the embodiment of the present utility model. According to the functional steps to be implemented, the method of selecting and designing a hardware circuit is well-known to those skilled in the art and is common knowledge in the technical field, and the details are not described herein.

The receiving port 43 is a data output port, which may be connected to a plurality of subsequent processing modules to output the third image data obtained by combining the first image data and the second image data.

The mass memory 44 may be any suitable type of non-volatile storage device, which is configured to provide enough storage space to save all original data obtained through collection, including but not limited to an SD card, an SSD hard disk, a mechanical hard disk, a flash memory or the like. In this embodiment, the mass memory 44 adopts an SD card.

A suitable number of the mass memory 44 may be selected according to actual needs. For example, the number may be set to two, and the two mass memories are respectively configured to store the first image data or the second image data. Certainly, the mass memory 44 may also directly use storage spaces or storage devices provided by other systems in the UAV. For example, the mass memory may be directly stored in a storage device of an image transmission apparatus of the UAV.

In addition to the three basic flow directions of image data, some image processing steps may further be added or reduced to meet different needs.

For example, the image processing step may further include an encoding operation on image data to reduce an amount of data required for transmission and storage. That is, encode, by using a preset encoding algorithm, the first image data, the second image data and the third image data obtained through combination (240).

The encoded first image data and second image data may be stored in a mass storage. The encoded third image data may be provided for visual processing or to a smart terminal for display to a user.

The preset encoding algorithm may specifically adopt any type of encoding algorithm, or one or more encoding algorithms may be selected for encoding according to a difference in the image data. For example, when the first image data and the second image data are pictures, a preset encoding algorithm may be JPEG encoding, DNG encoding or TIFF encoding. However, when the first image data and the second image data are videos, the preset encoding algorithm is H265 encoding or H264 encoding.

Correspondingly, the integration device may further include an encoding module 45. The encoding module is disposed between the output port and the mass memory and is configured to perform the above encoding operation.

In a traditional processing method, the first image data A and the second image data B are usually combined into single-channel third image data to be provided to a subsequent processing module (such as a mass memory or the like). However, upon combination, the image information stored in the mass storage device overlaps, and the original image information cannot be separated, resulting in deficiencies in the stored image information.

However, in some other dual-light camera designs, two different types of lenses and subsequent image processing structures are separately disposed completely. Therefore, the first image data A and the second image data B are transmitted independently of each other, and inconsistency is likely to occur between the first image data and the second image data. When a display device presents the first image data A and the second image data B to the user, the synchronization is poor, which seriously affects user experience.

Through the dual-light image integration method provided in the embodiment of the present invention, the problems existing in the above traditional processing methods may be solved properly, and the problem of loss of original information and non-synchronization of the image display during storage is also solved. In this embodiment, the first image data is used as infrared thermal imaging image data, and the second image data is used as visible light data for description.

Figure 5:
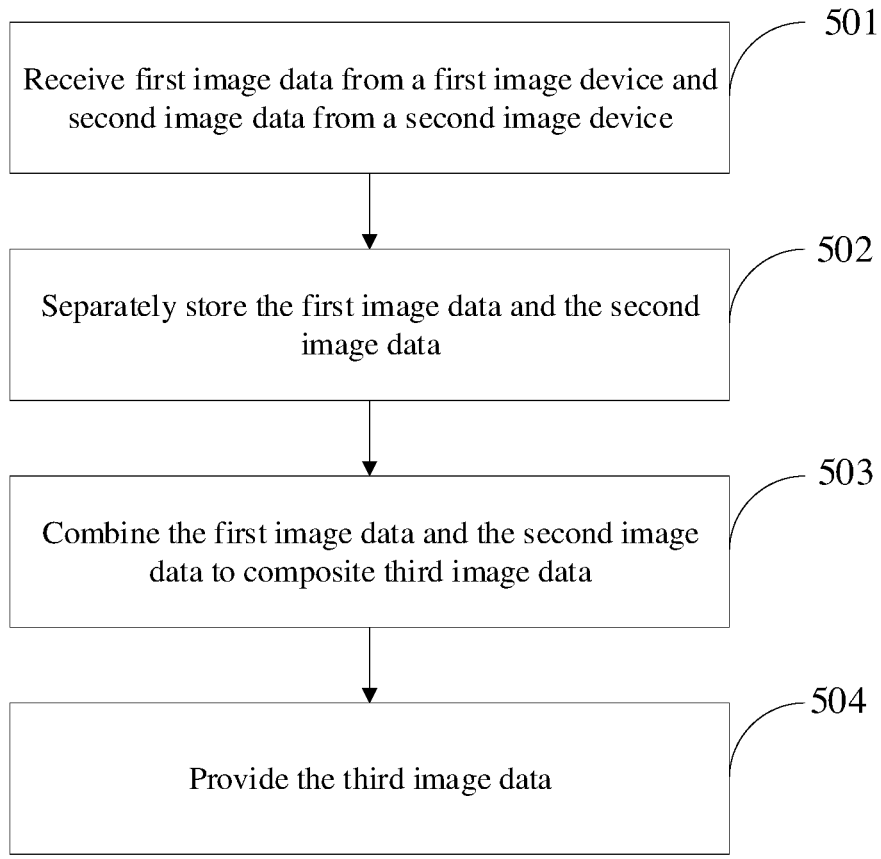
FIG. 5 is a flowchart of a dual-light image integration method according to an embodiment of the present invention.

FIG. 5 shows a dual-light image integration method according to an embodiment of the present invention. As shown in FIG. 5, the dual-light image integration method includes the following steps.

501: Receive first image data from a first image device and second image data from a second image device.

The first image data and the second image data are image data of different photographing types, for example, infrared images and visible light images. The first image data and the second image data correspond to each other. That is, the first image data and the second image data are collected by two lenses arranged side by side and are recorded data of the same picture or scene under different types of light rays.

502: Separately store the first image data and the second image data.

Upon completion of the data collection, the storage and recording of the first image data A and the second image data B are separately performed (flow direction 210). That is, the first image data A and the second image data B are respectively stored in different storage blocks or different storage devices of the same storage device.

503: Combine the first image data and the second image data to composite third image data.

The process of combining and compositing the first image data and the second image data refers to integrating the first image data and the second image data according to a certain algorithm rule. The third image data finally obtained through compositing is a piece of single-channel image data, which includes information about the first image data and the second image data.

504: Provide the third image data.

Single-channel third image data may be further provided for subsequent processing operations, for example, provided to an image transmission system or a smart terminal for display (flow direction 220) or for visual computing processing.

The third image data composited through the dual-light image integration method provided in the embodiment of the present invention does not have the problem of the synchronization of the dual-channel image data during the transmission, and has a better display effect when displayed on the display device, thereby improving user experience.

Certainly, the way of compositing the third image data may be adjusted accordingly according to different flow directions or different third image data. For example, in some embodiments, the third image data may be a picture-in-picture image displayed in the display device.

The picture-in-picture image is a special way of presenting content, which means that when the primary display picture is displayed in full screen, another secondary display picture that is played simultaneously is inserted into a part of the area of the primary display picture, so that the user can simultaneously observe two or more video images.

Specifically, the method of obtaining the picture-in-picture image through compositing in step 503 may include the following steps:

first scaling the first image data to a size corresponding to a first video picture and scaling the second image data to a size corresponding to a second video picture, where the sizes of the first video picture and the second video picture are determined according to actual conditions and are related to factors such as a screen size of the display device, a size of the picture-in-picture, whether the video picture is selected as the primary display picture and the like;

then determining which one of the first video picture and the second video picture is the primary display picture according to a selection instruction of a user; and finally superimposing the secondary display picture on the primary display picture, and generating the picture-in-picture image.

Figure 6:
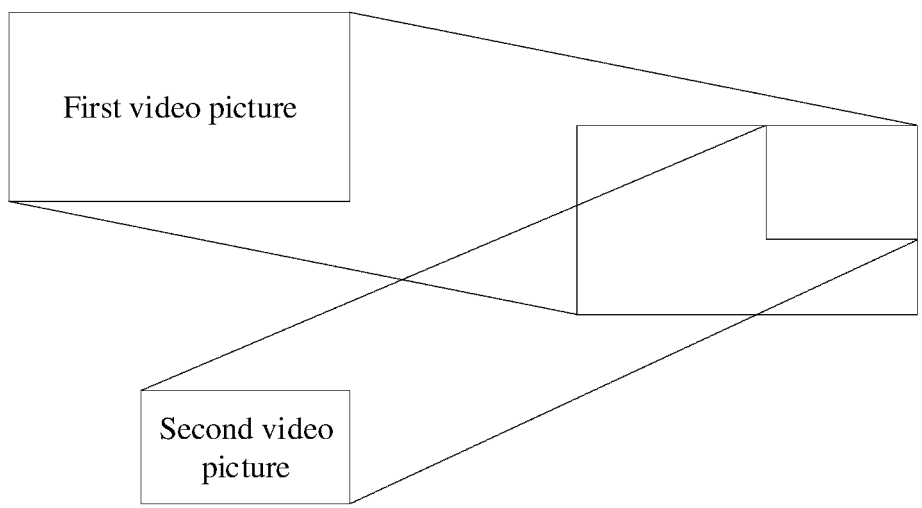
FIG. 6 is a schematic diagram of a picture-in-picture image according to an embodiment of the present invention.

For example, as shown in FIG. 6, with the first video picture as the primary display picture, the second video picture as the secondary display picture is superimposed on the primary display picture.

Figure 7:
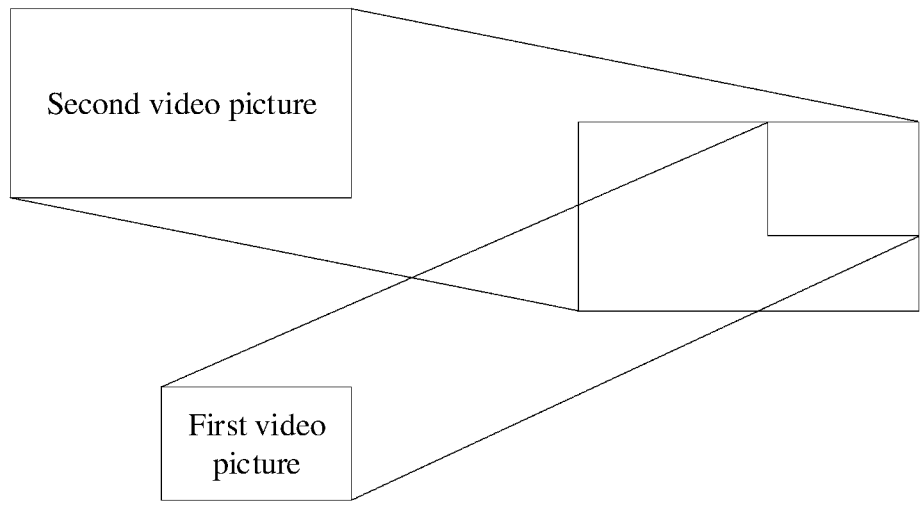
FIG. 7 is a schematic diagram of a picture-in-picture image according to another embodiment of the present invention.

Alternatively, as shown in FIG. 7, with the second video picture as the primary display picture, the first video picture as the secondary display picture is superimposed on the primary display picture, and the picture-in-picture image is generated.

The primary display picture refers to a part displayed in full screen in the picture-in-picture image, while the secondary display picture refers to a part of the display area superimposed on the part displayed in full screen. The user may select the first video picture or the second video picture as the primary display picture of the picture-in-picture image according to own needs. Certainly, the sizes of the primary display picture and the secondary display picture may further be adjusted accordingly.

Finally, the picture-in-picture image including the primary display picture and the secondary display picture is to be generated. The generated picture-in-picture image is a single-channel image, which is obtained upon combination of the first image data and the second image data. Each frame of the picture-in-picture image is complete, and the problem of synchronization may not occur after the image is transmitted to the display device.

In some other embodiments, when flow direction 230 is provided, the third image data may be a fused image obtained by fusing, pixel by pixel, the first image data and the second image data.

The fused image is basic image data provided for image visual processing, which is integrated by the first image data and the second image data through pixel-by-pixel fusion. The image visual processing may be any suitable one or more image processing algorithms, including edge detection, face recognition, smoothing processing and the like.

For the traditional fused image, after the first image data is directly compared with the second image data pixel by pixel, a larger one is taken from two gray values as the gray value of the fused image at the pixel. Such a simple fusion method may easily lead to loss of image details and affect the subsequent image visual processing process. For example, when a part of an area of the first image data has a richer texture and a part corresponding to the second image data is a high gray-scale area, texture of the fused image in the area is to disappear and cannot be saved.

Figure 8:
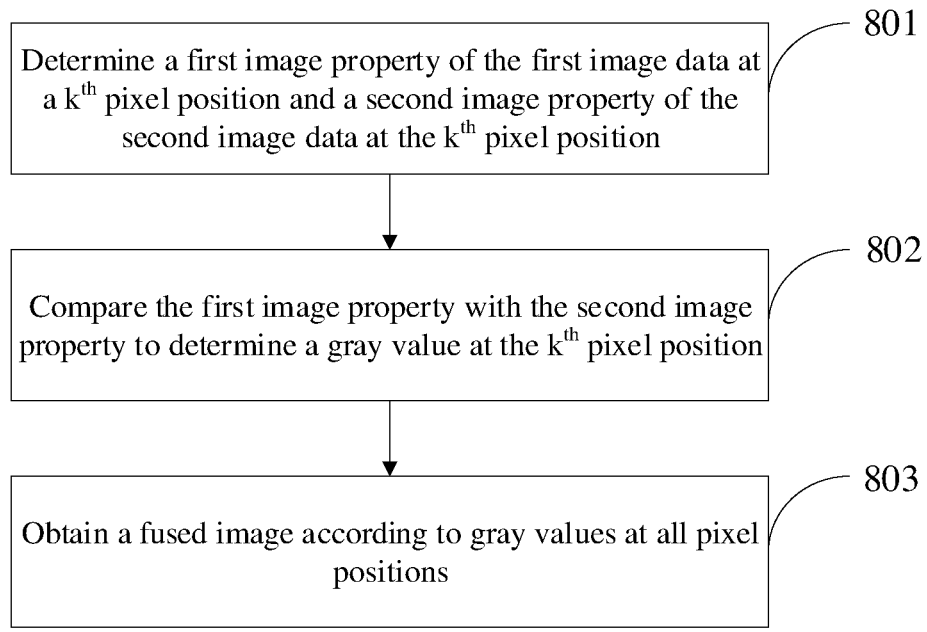
FIG. 8 is a flowchart of a method for generating a fused image according to an embodiment of the present invention.

In order to save the details of the image as much as possible and improve accuracy of subsequent image visual processing, in some embodiments, the method steps shown in FIG. 8 may be used to obtain the fused image. As shown in FIG. 8, the process of fusing the images includes the following steps.

801: Determine a first image property of the first image data at a $k^{th}$ pixel position and a second image property of the second image data at the $k^{th}$ pixel position according to gray values of the first image data and the second image data at each pixel position.

The pixel positions refer to positions of the pixels in the image and are used to identify different pixels. For example, in a two-dimensional image, the pixel position of a pixel may be represented by an array such as (x, y), where x is a position of the pixel in the length of the image, and y is a position of the pixel in the width of the image.

In this embodiment, k is used to represent different pixel positions. The image properties refer to characteristics of the image at the pixel position, including whether the texture is rich, whether the transition is smooth, whether the position is at an edge or the like. Generally, the image properties may be calculated or defined by using a domain of pixel positions.

802: Compare the first image property with the second image property to determine the gray value at the $k^{th}$ pixel position, where k is an integer from 1 to K, where K is a number of pixels of the first image data and the second image data.

For a two-dimensional image, numbers of pixels included in the length and width are multiplied to obtain a number of pixels in the two-dimensional image. As described above, pixels between the first image data and the second image data correspond to each other and have the same number.

803: Obtain the fused image according to the gray values at all pixel positions.

After each pixel position is determined repeatedly and the gray values at the pixel positions are determined, the final fused image may be obtained and provided for the subsequent visual processing.

Figure 9:
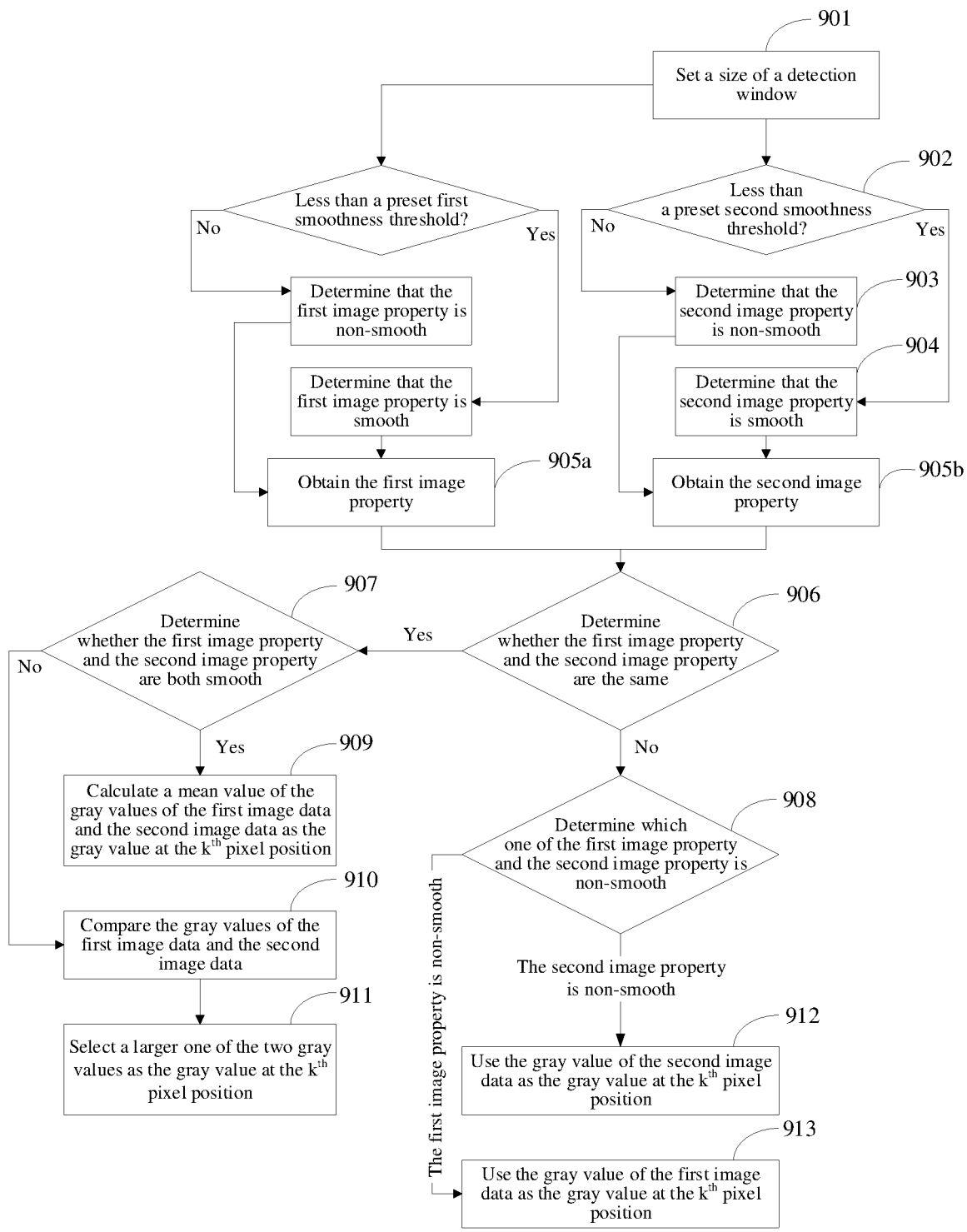
FIG. 9 is a flowchart of an image fusing method according to an embodiment of the present invention.

FIG. 9 shows a specific method for image fusion according to an embodiment of the present invention. As shown in FIG. 9, the image fusion method may include the following steps.

901: Set a size of a detection window. The size of detection window refers to a size of a window for detection and sampling during calculation of an image property, which is configured to define a neighborhood of a suitable size.

902: Determine, through a preset detection window, whether smoothness at the $k^{th}$ pixel position is less than a preset smoothness threshold. If so, step 903 is performed, and if not, step 904 is performed.

Figure 10:
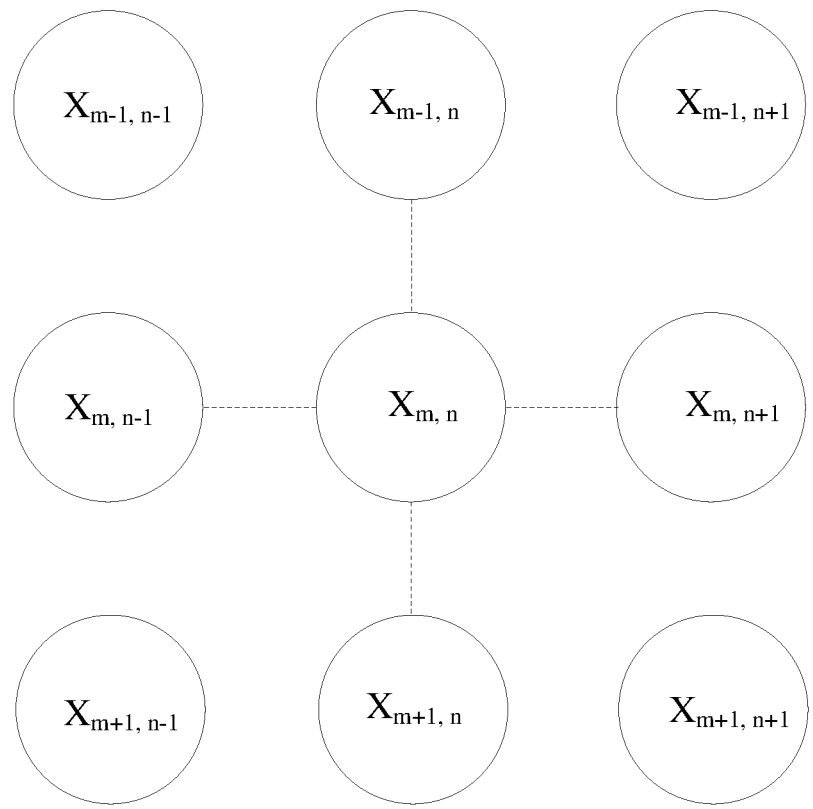
FIG. 10 is a schematic diagram of a detection window according to an embodiment of the present invention.

Specifically, an appropriate size may be set for the detection window according to actual conditions. For example, as shown in FIG. 10, a detection window with a length and a width of both 3 pixels may be provided. Each image property is calculated according to the gray value relationship between the pixels in the detection window.

FIG. 10 is a schematic diagram of a detection window according to an embodiment of the present invention. As shown in FIG. 10, in a two-dimensional image, the size of the detection window is 3×3, the $k^{th}$ pixel position is represented by $X_{m, n}$, and m and n respectively represent pixel points in a row and a column of the two-dimensional image.

Differences between the gray value at the $k^{th}$ pixel position and gray values at a plurality of adjacent pixel positions in the detection window are first sequentially calculated. That is, gray value differences between $X_{m-1, n}$ and $X_{m, n}$, $X_{m+1, n}$ and $X_{m, n}$, $X_{m, n-1}$ and $X_{m, n}$ and $X_{m, n-1}$ and $X_{m, n}$, are respectively calculated.

Then, it is determined whether the difference from the gray values obtained through the above calculation is less than the preset smoothness threshold. When the differences of all gray values are all less than the smoothness threshold, step 903 is performed, or otherwise, step 904 is performed. The smoothness threshold is an empirical value, which may be selected by a person skilled in the art according to actual image data, data types and/or other related factors.

903: Determine that image properties at the $k^{th}$ pixel position are smooth.

Smoothness means that an image area at a current pixel position has an image feature with less texture, which may usually indicate that there is less detail at the pixel.

904: Determine that the image properties at the $k^{th}$ pixel position are non-smooth.

Non-smoothness means that the image area at the position has a richer texture as for the defined standard. Such an image feature may indicate that the pixel position has more details and needs to be preserved.

Step 901 to step 904 are respectively performed on the first image data and the second image data, so as to determine whether the image properties at the $k^{th}$ pixel position are smooth.

Specifically, since the types of the image data are different, different determination standards or smoothness thresholds may further be used when it is determined whether the first image data and the second image data are smooth. For example, the first smoothness threshold is used as the first image data, and the second smoothness threshold is used as the second image data. A first image property of the first image data at the pixel position k (905a) and a second image property of the second image data at the same pixel position (905b) are finally obtained.

Upon determining of the first image property and the second image property, the following steps may continue to be performed.

906: Determine whether the first image property and the second image property are the same. If so, step 907 is performed, and if not, step 908 is performed.

907: Determine whether the first image property and the second image property are both smooth. If so, step 909 is performed. If not, step 910 is performed.

908: Determine which one of the first image property and the second image property is non-smooth. If the first image property is non-smooth, step 912 is performed. If the second image property is non-smooth, step 913 is performed.

909: Calculate a mean value of the gray values of the first image data and the second image data at the $k^{th}$ pixel position as the gray value at the $k^{th}$ pixel position.

910: Compare the gray values of the first image data and the second image data at the $k^{th}$ pixel position.

911: Select a larger one of the two gray values as the gray value at the $k^{th}$ pixel position.

912: Use the gray value of the second image data at the $k^{th}$ pixel position as the gray value at the $k^{th}$ pixel position.

913: Use the gray value of the first image data at the $k^{th}$ pixel position as the gray value at the $k^{th}$ pixel position.

The implementation of the steps shown in FIG. 9 in actual operations is described in detail below with reference to specific examples. It is assumed that the first image data is visible light, the second image data is infrared thermal imaging image data, and the size of the detection window is 3×3.

$x_{m,n}$ represents gray scale of the visible light at a pixel (m, n); $T_1$ is the first smoothness threshold; and $y_{m,n}$ represents gray scale of the infrared thermal imaging image data at the pixel (m, n), $T_2$ is the second smoothness threshold, and $z_{m,n}$ is gray scale of the fused image at the pixel (m, n).

Figure 11:
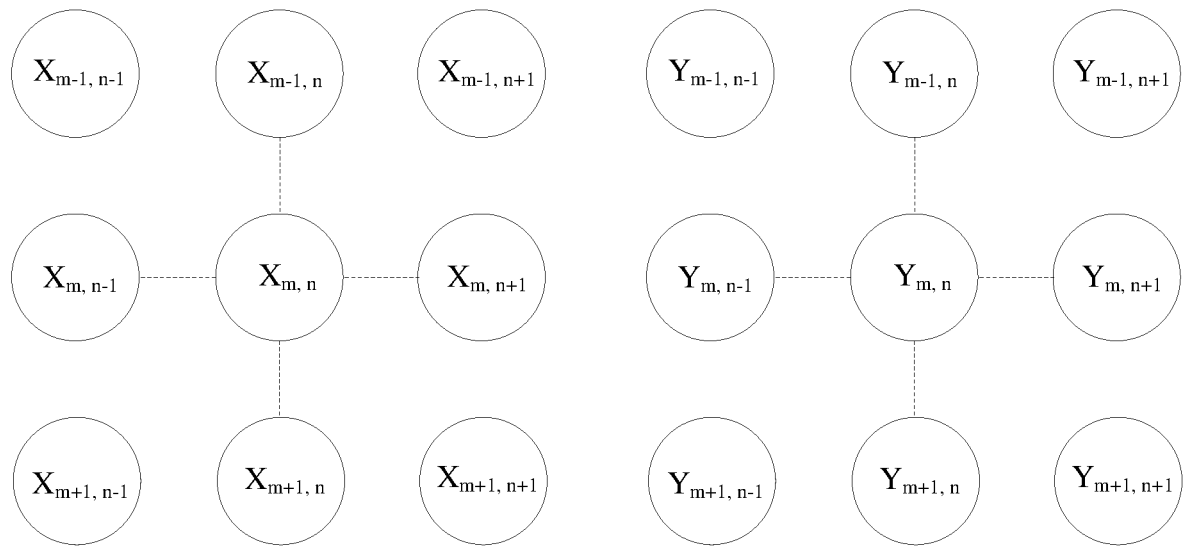
FIG. 11 is a schematic diagram of the detection window for image integration according to an embodiment of the present invention.

As shown in FIG. 11, gray scale data including the pixel (m, n) and a total of 9 pixels around the pixel in the first image data and the second image data is first collected.

Then, gray scale $z_{m,n}$ of the fused image at the pixel (m, n) is calculated according to the following piecewise function composed of four-segment curves.

1)

When $\begin{cases} |x_{m,n} - x_{m-1,n}| < T_1 \\ |x_{m,n} - x_{m+1,n}| < T_1 \\ |x_{m,n} - x_{m,n-1}| < T_1 \\ |x_{m,n} - x_{m,n+1}| < T_1 \end{cases}$ and $\begin{cases} |y_{m,n} - y_{m-1,n}| < T_2 \\ |y_{m,n} - y_{m+1,n}| < T_2 \\ |y_{m,n} - y_{m,n-1}| < T_2 \\ |y_{m,n} - y_{m,n+1}| < T_2 \end{cases}$ are satisfied, let $z_{m,n} = \frac{x_{m,n} + y_{m,n}}{2}$.

The first curve is the situation in step 909 in FIG. 9, and the corresponding determination condition is that both the first image property and the second image property are smooth.

2)

When $\begin{cases} |x_{m,n} - x_{m-1,n}| \geq T_1 \\ \text{or } |x_{m,n} - x_{m+1,n}| \geq T_1 \\ \text{or } |x_{m,n} - x_{m,n-1}| \geq T_1 \\ \text{or } |x_{m,n} - x_{m,n+1}| \geq T_1 \end{cases}$ and $\begin{cases} |y_{m,n} - y_{m-1,n}| < T_2 \\ |y_{m,n} - y_{m+1,n}| < T_2 \\ |y_{m,n} - y_{m,n-1}| < T_2 \\ |y_{m,n} - y_{m,n+1}| < T_2 \end{cases}$ are satisfied, let $z_{m,n} = x_{m,n}$.

The second curve is the situation in step 913 in FIG. 9, and the corresponding determination condition is that the first image property is smooth and the second image property is non-smooth.

3)

When $\begin{cases} |x_{m,n} - x_{m-1,n}| < T_1 \\ |x_{m,n} - x_{m+1,n}| < T_1 \\ |x_{m,n} - x_{m,n-1}| < T_1 \\ |x_{m,n} - x_{m,n+1}| < T_1 \end{cases}$ and $\begin{cases} |y_{m,n} - y_{m-1,n}| \geq T_2 \\ \text{or } |y_{m,n} - y_{m+1,n}| \geq T_2 \\ \text{or } |y_{m,n} - y_{m,n-1}| \geq T_2 \\ \text{or } |y_{m,n} - y_{m,n+1}| \geq T_2 \end{cases}$ are satisfied, let $z_{m,n} = y_{m,n}$.

The third curve is the situation in step 912 in FIG. 9, and the corresponding determination condition is that the first image property is smooth and the second image property is non-smooth.

4) When the above three conditions are not satisfied, let $z_{m,n} = \max(x_{m,n}, y_{m,n})$.

The fourth curve is the situation in step 911 in FIG. 9, and the corresponding determination condition is that both the first image property and the second image property are non-smooth.

Through the above methods, the gray value of the final pixel can be calculated according to the specific situation of each pixel position. In this way, image details included in the two types of image data can be better reflected and retained. An information source of the finally obtained fused image is relatively rich, and the output effect of the subsequent vision processing algorithm is consistent, which also facilitates improvement of the processing performance of the vision processing algorithm.

According to the dual-light image integration method provided in the embodiment of the present invention, a fused image or a picture-in-picture image can be provided. The user can input corresponding control instructions on the smart terminal 20 to adjust the pictures displayed on the display screen. For example, the user may input a switching instruction to use the infrared image as the primary display picture and the visible light image as the secondary display picture, or may further control the smart terminal to directly display the fused image.

In this way, the images transmitted to the image transmission apparatus are superimposed to form single-channel image data in a picture-in-picture manner, and upon decoding and display, can better support real-time viewing of the smart terminal, so as to prevent the two-channel images being out of sync.

A person of ordinary skill in the art may further be aware that, in combination with examples of each step of the dual-light image integration method described in the embodiments disclosed in this specification, the present application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions.

A person skilled in the art may use different methods to implement the described functions for each particular application, but this implementation shall not be considered as going beyond the scope of the present invention. The computer software may be stored in a computer-readable storage medium. When being executed, the program may include the processes of the embodiments of the foregoing methods. The storage medium may be a magnetic disk, an optical disc, a read-only memory (ROM), or a random access memory (RAM).

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

The invention claimed is:

1. A dual-light image integration method, comprising:
receiving first image data from a first image device and second image data from a second image device;
separately storing the first image data and the second image data;
combining the first image data and the second image data to composite third image data; and
providing the third image data;
wherein the third image data is a fused image obtained by fusing, pixel by pixel, the first image data and the second image data;
wherein the step of combining the first image data and the second image data to composite the third image data comprises:
determining a first image property of the first image data at a $k^{th}$ pixel position and a second image property of the second image data at the $k^{th}$ pixel position according to gray values of the first image data and the second image data at each pixel position;
comparing the first image property with the second image property to determine the gray value at the $k^{th}$ pixel position, wherein k is an integer from 1 to K, wherein K is a number of pixels of the first image data and the second image data; and
obtaining the fused image according to the gray values at all pixel positions.

2. The dual-light image integration method according to claim 1, wherein the third image data is a picture-in-picture image comprising a primary display picture and a secondary display picture superimposed on the primary display picture.

3. The dual-light image integration method according to claim 2, wherein the step of combining the first image data and the second image data to composite the third image data comprises:
scaling the first image data to a size corresponding to a first video picture and scaling the second image data to a size corresponding to a second video picture;
with the first video picture as the primary display picture, superimposing the second video picture as the secondary display picture on the primary display picture; or with the second video picture as the primary display picture, superimposing the first video picture as the secondary display picture on the primary display picture; and
generating the picture-in-picture image comprising the primary display picture and the secondary display picture.

4. The dual-light image integration method according to claim 1, wherein the step of determining the first image property of the first image data at the $k^{th}$ pixel position and the second image property of the second image data at the $k^{th}$ pixel position according to the gray values of the first image data and the second image data at each pixel position comprises:
determining, through a preset detection window, whether smoothness at the $k^{th}$ pixel position exceeds a preset smoothness threshold, wherein
if so, the image properties at the $k^{th}$ pixel position are determined to be smooth, and
if not, the image properties at the $k^{th}$ pixel position are determined to be non-smooth.

5. The dual-light image integration method according to claim 4, wherein the step of comparing the first image property with the second image property to determine the gray value at the $k^{th}$ pixel position comprises:
when the first image property and the second image property are both smooth, determining that the gray value at the $k^{th}$ pixel position is a mean value of the gray values of the first image data and the second image data at the $k^{th}$ pixel position;
when the first image property is smooth and the second image property is non-smooth, determining that the gray value at the $k^{th}$ pixel position is the gray value of the second image data at the $k^{th}$ pixel position; and
when the first image property is non-smooth and the second image property is smooth, determining that the gray value at the $k^{th}$ pixel position is the gray value of the first image data at the $k^{th}$ pixel position.

6. The dual-light image integration method according to claim 4, wherein the step of comparing the first image property with the second image property to determine the gray value at the $k^{th}$ pixel position comprises:
when the first image property and the second image property are both non-smooth, comparing the gray values of the first image data and the second image data at the $k^{th}$ pixel position; and
selecting a larger one of the gray values as the gray value at the $k^{th}$ pixel position.

7. The dual-light image integration method according to claim 4, wherein the step of determining, through the preset detection window, whether the smoothness at the $k^{th}$ pixel position exceeds the preset smoothness threshold comprises:
calculating differences between the gray value of the first image data at the $k^{th}$ pixel position and gray values at a plurality of adjacent pixel positions, wherein the adjacent pixel positions are selected by using the detection window; and
determining whether the differences from the gray values at the plurality of adjacent pixel positions are all less than a first preset smoothness threshold, wherein
if so, the first image property at the $k^{th}$ pixel position is determined to be smooth, and
if not, the first image property at the $k^{th}$ pixel position is determined to be non-smooth.

8. The dual-light image integration method according to claim 4, wherein the step of determining, through the preset detection window, whether the smoothness at the $k^{th}$ pixel position exceeds the preset smoothness threshold comprises:
    calculating differences between the gray value of the second image data at the $k^{th}$ pixel position and gray values at a plurality of adjacent pixel positions, wherein the adjacent pixel positions are selected by using the detection window; and
    determining whether the differences from the gray values at the plurality of adjacent pixel positions are all less than a second preset smoothness threshold, wherein
        if so, the second image property at the $k^{th}$ pixel position is determined to be smooth, and
        if not, the second image property at the $k^{th}$ pixel position is determined to be non-smooth.

9. The dual-light image integration method according to claim 1, further comprising: performing one or more visual processing operations on the fused image.

10. The dual-light image integration method according to claim 1, wherein the first image data is infrared thermal imaging image data, and the second image data is visible light image data.

11. The dual-light image integration method according to claim 1, further comprising: encoding the first image data, the second image data and the third image data by using a preset encoding algorithm.

12. A dual-light image integration device, comprising:
    a memory storing computer executable instructions; and
    a processor configured to execute the instructions to:
        receive first image data from a first image device and second image data from a second image device;
        separately store the first image data and the second image data;
        combine the first image data and the second image data to composite third image data; and
        provide the third image data;
    wherein the third image data is a fused image obtained by fusing, pixel by pixel, the first image data and the second image data;
    wherein the step of combining the first image data and the second image data to composite the third image data comprises:
    determining a first image property of the first image data at a $k^{th}$ pixel position and a second image property of the second image data at the $k^{th}$ pixel position according to gray values of the first image data and the second image data at each pixel position;
    comparing the first image property with the second image property to determine the gray value at the $k^{th}$ pixel position, wherein k is an integer from 1 to K, wherein K is a number of pixels of the first image data and the second image data; and
    obtaining the fused image according to the gray values at all pixel positions.

13. The dual-light image integration device according to claim 12, wherein the processor is further configured to: encode the first image data, the second image data and the third image data by using a preset encoding algorithm; and
    separately store the encoded first image data and the encoded second image data.

14. The dual-light image integration device according to claim 12, wherein when the first image data and the second image data are pictures, the first image data, the second image data and the third image data are encoded through JPEG encoding, DNG encoding or TIFF encoding; and when the first image data and the second image data are videos, the first image data, the second image data and the third image data are encoded through H265 encoding or H264 encoding.

15. An unmanned aerial vehicle (UAV), comprising:
    a UAV body carrying a first image device and a second image device arranged side by side;
    a dual-light image integration device, wherein the dual-light image integration device is connected to the first image device and the second image device, and the dual-light image integration device comprises:
        a memory storing computer executable instructions; and
        a processor configured to execute the instructions to:
            receive first image data from the first image device and second image data from the second image device;
            separately store the first image data and the second image data;
            combine the first image data and the second image data to composite third image data; and
            provide the third image data;
        wherein the third image data is a fused image obtained by fusing, pixel by pixel, the first image data and the second image data;
        wherein the step of combining the first image data and the second image data to composite the third image data comprises:
        determining a first image property of the first image data at a $k^{th}$ pixel position and a second image property of the second image data at the $k^{th}$ pixel position according to gray values of the first image data and the second image data at each pixel position;
        comparing the first image property with the second image property to determine the gray value at the $k^{th}$ pixel position, wherein k is an integer from 1 to K, wherein K is a number of pixels of the first image data and the second image data; and
        obtaining the fused image according to the gray values at all pixel positions; and
    an image transmission apparatus connected to the dual-light image integration device and configured to transmit the third image data composited by the dual-light image integration device to a ground terminal.

16. The UAV according to claim 15, wherein the first image device is an infrared camera, and the second image device is a high-definition camera.

* * * * *